Figure 1:
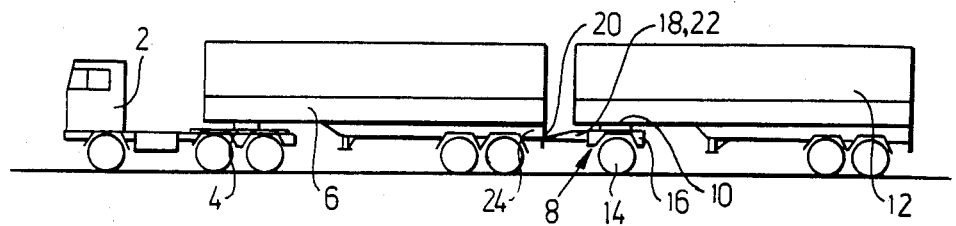

United States Patent [19]

Gustavsson et al.

[11] Patent Number: 4,645,226
[45] Date of Patent: Feb. 24, 1987

[54] DOLLY HAVING AN ADJUSTING FLEXIBLE OR RIGID CONNECTION

[75] Inventors: Hans Gustavsson; Christer Bystedt, both of Vänersborg, Sweden

[73] Assignee: Släpvagnskopplingar AB, Sweden

[21] Appl. No.: 645,318

[22] PCT Filed: Oct. 11, 1983

[86] PCT No.: PCT/SE83/00351
§ 371 Date: Aug. 21, 1984
§ 102(e) Date: Aug. 21, 1984

[87] PCT Pub. No.: WO84/02501
PCT Pub. Date: Jul. 5, 1984

[30] Foreign Application Priority Data

Dec. 22, 1982 [SE] Sweden .................................. 8207337
Apr. 13, 1983 [SE] Sweden .................................. 8302043
Jun. 17, 1983 [SE] Sweden .................................. 8303486

[51] Int. Cl.<sup>4</sup> ............................................. B62D 53/00
[52] U.S. Cl. ............................. 280/423 A; 280/411 C; 280/446 R; 280/474; 280/DIG. 14; 172/450
[58] Field of Search ............... 280/423 A, 474, 476 R, 280/446 B, 479 R, DIG. 14, 408, 432, 456 A, 411 C, 411 R; 172/273, 450; 188/112 A

[56] References Cited

U.S. PATENT DOCUMENTS

| | | | |
|---|---|---|---|
| 3,663,039 | 5/1972 | Morgan | 280/408 |
| 3,801,137 | 4/1974 | Zucca | 280/418 X |
| 3,815,939 | 6/1974 | Pettay | 280/432 |
| 4,133,552 | 1/1979 | Sheine | 280/446 B |
| 4,313,616 | 2/1982 | Howard | 280/446 B |

*Primary Examiner*—John J. Love
*Assistant Examiner*—Everett G. Diederiks, Jr.
*Attorney, Agent, or Firm*—McGlew and Tuttle

[57] ABSTRACT

A dolly carries a fifth wheel for connecting a trailing vehicle, a drawing device (18,20,24) for pivotable connection of the dolly (8) to a drawing vehicle and elongated side supports (22) are movable from a free position to a locked position in which they form an essentially rigid connection between the dolly and a support element (24) carried by the drawing vehicle. Hereby the connection between the dolly and the drawing vehicle can be made sidewardly rigid if needed. By the side supports (22) being carried by pivotal supports (26), which allow sidewards pivoting of the side supports to the locked position, a vehicle rig, including the dolly, can maintain a maximum of allowed length both with and without sidewards rigidity.

6 Claims, 14 Drawing Figures

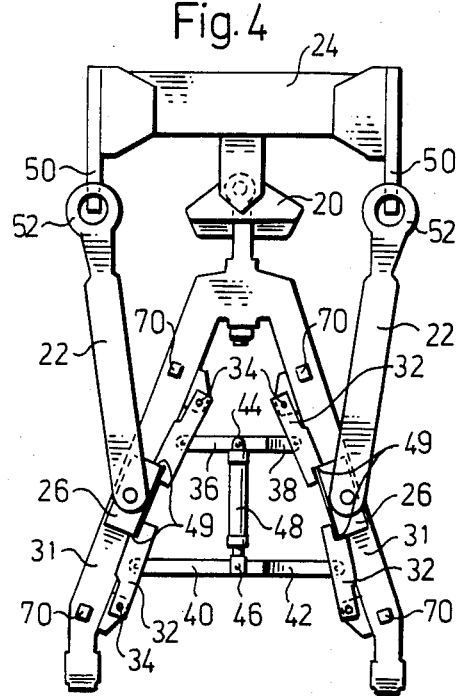
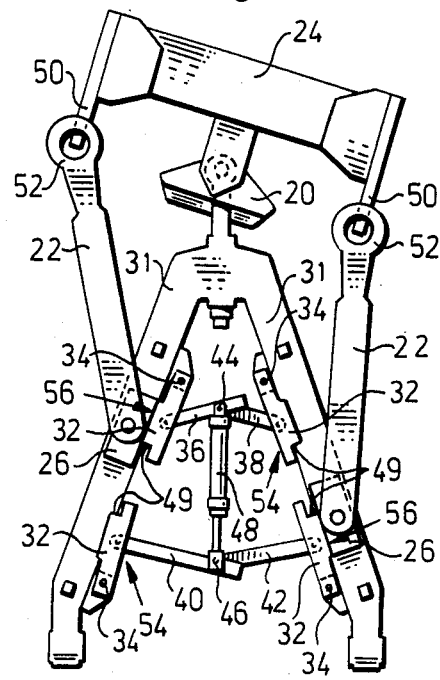
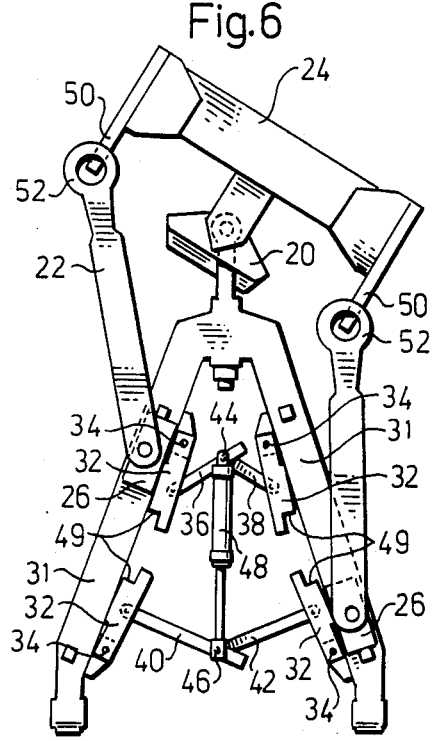

DOLLY HAVING AN ADJUSTING FLEXIBLE OR RIGID CONNECTION

The present invention relates to a dolly carrying a coupling, e.g. a fifth wheel, for connecting a trailing vehicle, a draw device for pivotable connection of the dolly to a drawing vehicle and elongated side supports which by a connection movement are movable from a free position to a locked position in which they form an essentially rigid connection between the dolly and a support element carried by the drawing vehicle in order to make the connection between the dolly and the drawing vehicle sidewardly rigid if needed.

Practical tests with vehicle rigs of the double semitrailer combination type have shown that in connection with driving with a sidewardly rigid dolly at low velocities and with forceful maneuvers, abrupt turns, etc., the stresses in the side supports become great, and the tires of semitrailer and dolly rub heavily with great wear of the tires as a consequence. The side supports should therefore be able to be eliminated in some way in connection with driving at lower velocities. It is also only at high velocities that dynamic stability becomes improved with a sidewardly rigid dolly.

If the drawbar is extended at lower velocities, such as is suggested in the Swedish patent application No. 8102442-4 the side supports are principally disengaged as desired. Simultaneously, however, the total length of the rig is increased and this can be less desireable when the aim is a rig having the maximum allowed length of 24 meters also with a rigid dolly.

One object of the present invention is to provide a dolly structure that, with unchanged length of a vehicle rig of the double semitrailer combination type, optionally allows driving with a sidewardly rigid and a not sidewardly rigid dolly.

A further object of the invention is then to make possible, to great extent, an automation of the change to and from a sidewardly rigid dolly.

The above objects have been attained in that, in a dolly of the kind defined by way of introduction, the side supports are carried by pivotal supports allowing sidewards pivoting of the side supports to the locked position.

The invention shall now be described more closely below with reference to a number of embodiments shown on the attached drawings, whereby also the advantages of the invention will appear.

Figure 2:
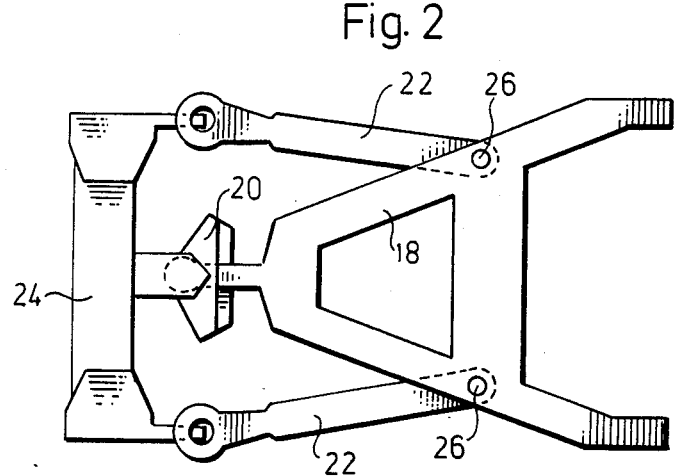
Figure 3:
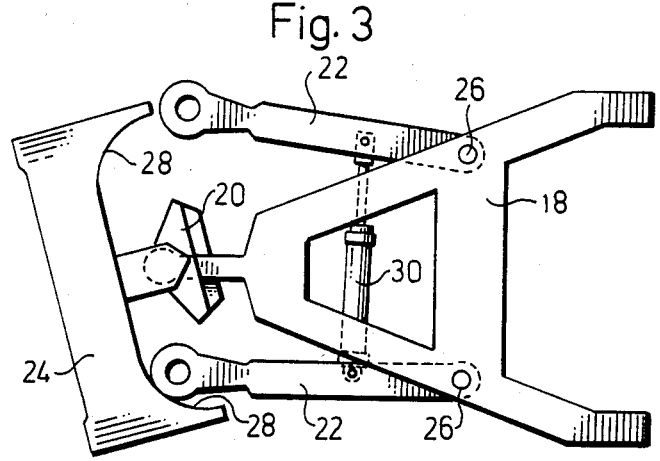
Figure 7:
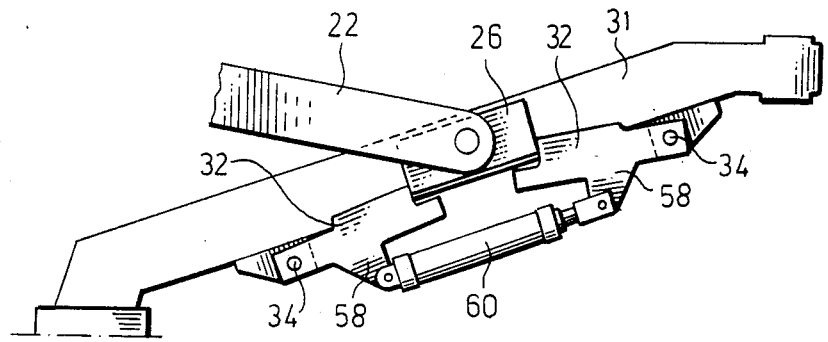
Figure 8:
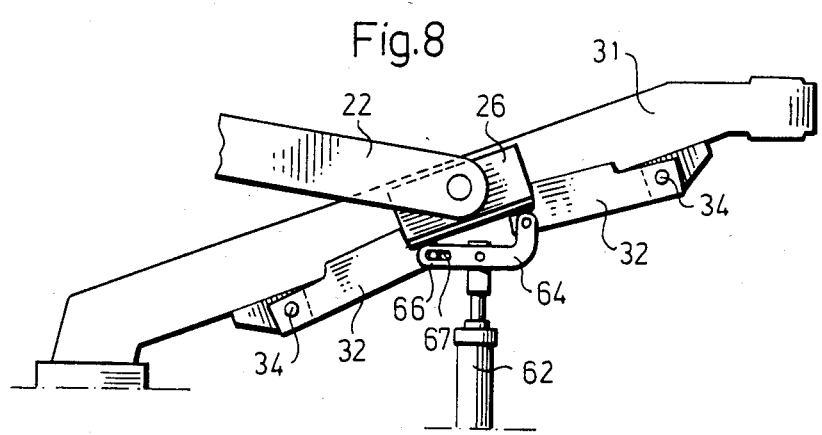
Figure 13:
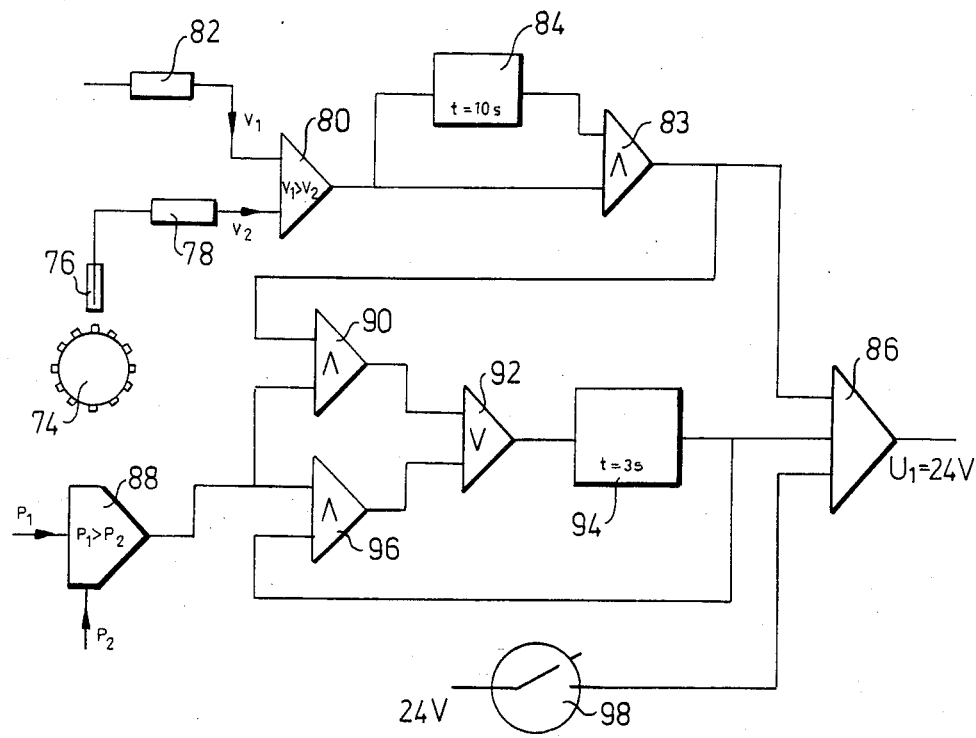
Figure 14:
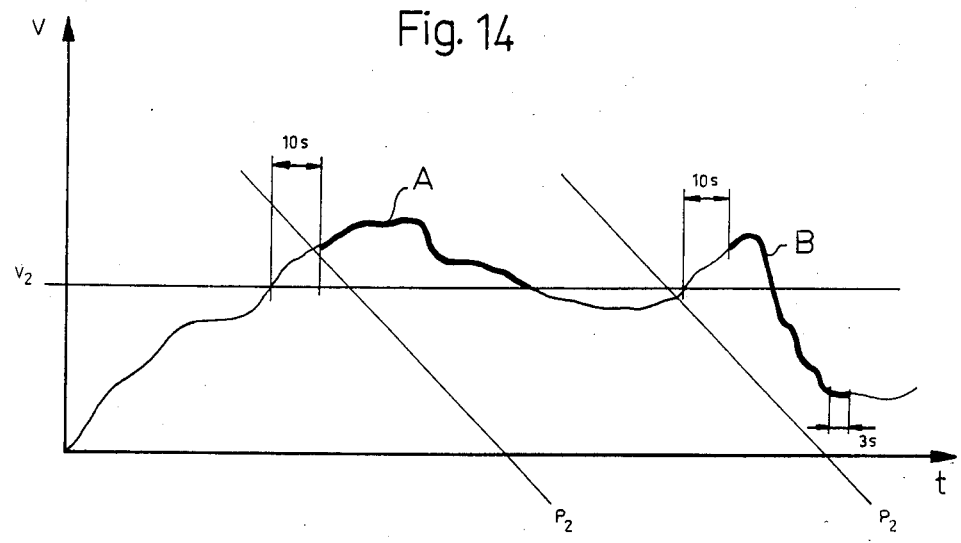

In the drawings;

FIG. 1 illustrates a double semitrailer combination in sideview and simplified;

FIGS. 2 and 3 schematically in a plan view show the drawbar portion of a dolly included in a rig according to FIG. 1, in order to illustrate first and second embodiments of the invention;

FIGS. 4, 5 and 6 in similar views as FIGS. 2 and 3, show a third embodiment;

FIGS. 7 and 8 in the form of portions of similar views as FIGS. 2 and 3, show fourth and fifth embodiments;

FIGS. 9, 10 and 11, 12 still in similar views, show sixth and seventh embodiments;

FIG. 13 schematically shows a coupling device for making possible automatic connection and disconnection of the function according to the invention; and FIG. 14 is a diagram illustrating the mode of operation of the coupling device according to FIG. 13.

In the different Figures the same reference numerals have been used for indicating elements with the same or similar functions.

The double semitrailer combination shown in FIG. 1 includes a drawing vehicle 2 with a fifth wheel 4. By means of the fifth wheel a semitrailer 6 is connected to the drawing vehicle 2 in a conventional manner. A dolly 8 carrying a fifth wheel 10 is connected to the semitrailer 6. By means of the dolly 8 a second semitrailer 12 is connected into the vehicle combination.

The dolly 8 includes a frame 16 carried by wheels 14 and on which the fifth wheel 10 is mounted. The frame 16 carries a drawbar 18 in a way that can be conventional per se. The shaft of the wheels 14 can be arranged to be tracking at lower velocities of the vehicle combination, but to be locked at higher velocities.

The drawbar 18 at its forward end includes a towing eyelet arranged to be connected to e.g. a conventional trailer coupling 20 of the yoke type.

Common to all embodiments according to FIGS. 2-12 is that the dolly 8 has elongate side supports 22, which by means of a connection movement are movable from a free position to a locked position in which they form an essentially rigid connection between the dolly 8 and a support element 24 carried by the semitrailer 6, the trailer coupling 20 being mounted on said support element. Hereby the connection between the semitrailer 6 and the dolly 8 can be made sidewardly rigid if needed.

More particularly, the side supports 22 in all embodiments are carried by pivotal supports 26, which allow sidewards pivoting of the side supports 22 to said locked position. Below, a number of different embodiments of the side support 22 and the pivotal supports 26 will thus be described, but since the function of said elements is the same in all embodiments the reference numerals 22 and 26, respectively, will be used throughout.

The support element 24 can either form part of the frame of the semitrailer 6 and thus in a conventional way be formed as the draw beam thereof, or it can form a part of the draw device of the dolly. In the latter case the support element 24 and the coupling between it and the draw bar are carried by the dolly. The frame of the semitrailer 6 can then be formed with guides, not shown, at its rear end, into which the support element 24 can be shifted and disconnectably connected with the frame of the semitrailer 6. Of course, the coupling need not then be formed as a yoke type coupling.

In the embodiments according to FIGS. 2 and 3 the pivotal supports 26 form a fixed portion of the drawbar 18.

The purpose of the side supports is to prevent the dolly from rotating around the coupling pivot and this can be attained, by connecting the outer corners of the vehicle portions to each other. Three cases are then conceivable.

Case 1. The side supports carry compressive forces only. The pulling forces are then taken up by the trailer coupling. The advantages are that it will be easier to form side supports and pressure surface.

Case 2. The side supports carry pulling forces only. The compressive forces are then taken up by the trailer coupling. The advantages are a simpler dimension of the side supports and that it is easier to take up pulling forces. It is also advantageous for the trailer to take compressive forces only.

Case 3. The side supports carry both pulling and compressive forces. The trailer coupling is nearly completely unloaded and only carries vertical and side forces. The advantages are that the forces in the side supports will be much less (half) and are directly transmitted into the frame of the semitrailer.

Operation of the side supports 22 can be carried out automatically from the driver's cabin. The side supports shall be able to be moved out, each by itself, but simultaneously so that if the vehicles 6, 10 (12) are angled with respect to each other, one support is entirely moved out whereas the other support moves out successively as the vehicles become aligned. This can be attained by providing the support element 24 according to FIG. 3 with a "touch ramp" 28 so that the support 22 shall not be caught anywhere but shall slide out to its correct position as the vehicles 6 and 12 become aligned. Since it is desirable to have the least possible play between side support 22 and support surface of the support element 24 it may be difficult to get the other side to move into position. This is facilitated by the fact that the coupling 20 is accommodated in rubber blocks) which implies that it will be drawn out a little (pressed inwardly a little, when the first side support 22 is moved into engagement. The operation of the support 22 can be carried out by means of a cylinder, either a cylinder 30 sitting between the two supports 22 or two cylinders each acting upon its own support 22, but which get a control impulse simultaneously.

If the side supports have been made to take up only drawing forces, alternatively drawing and compressive forces the side support that is able to move out completely (at an angle between the semitrailer and the dolly) should be given the possibility to yield elastically somewhat, when the vehicles are brought into alignment, in order to be able to slide into the right position.

Where the side supports only are made to take up drawing forces a solution is also conceivable where the side support can move into the right position by using a back stop (not shown) on the support element 24 which can be opened upon receiving pressure from the rear but not upon being pulled from the front.

In the embodiment according to FIGS. 4-6 the pivotal supports 26 in the form of sliding blocks or slide means are shiftably mounted on the side beams 31 of the drawbar 18 which form guide means for the sliding blocks.

A locking device for each pivotal support 26 includes two stop blocks 32, which are each pivotally arranged on the drawbar 18 about a vertical axis 34. The opposite stop blocks 32 are pivotally linked in pairs by means of two links 36, 38 and 40, 42, respectively. Between the common pivot 44 of links 36, 38 on one hand and the common pivot 46 of links 40, 42 on the other hand, a pneumatic or hydraulic cylinder 48 acts. By means of the hydraulic cylinder 48 the stop blocks 32 can be pivoted into or out of the sliding path of the pivotal support 26. In the position in the sliding path, shown in FIG. 4, the distance between abutments 49, at the end of the stop blocks 32 facing each other is essentially the same as the dimension of the pivotal support 26 in the sliding direction thereof. Hereby an essentially playfree locking of the pivotal support 26 between the stop blocks 32 is obtained.

On each side of the coupling 20 the support element 24 carries coupling means 50 intended to be connected to corresponding coupling means 52 at the end of each of the side supports 22. The coupling means 52 can e.g. be a coupling eye and the coupling means 50 a coupling hook or similar structure, adapted thereto.

In the not connected position of the drawbar 18 the side supports 22 are kept inwardly pivoted against the side beams of the drawbar. Upon connection of the drawbar 18 to the coupling 20, also the side supports 22 are connected each to its coupling means 50 in a manner that is manually or automatically controlled.

When driving at lower velocities, and thus when it is desirable that the stiffening action of the side supports shall be able to be eliminated, the stop blocks 32 are pivoted out of the sliding path of the pivotal support 26 so that the latter is freely slideable back and forth along the side beam of the drawbar, as seen in FIG. 6. If it is desired that the side supports 22 shall be put into function, a force is applied by means of the cylinder 48 on the stop blocks 32, that tends to pivot them into the sliding path of the pivotal support 26. This can happen independently of the mutual angular position of the drawing vehicle and the trailing vehicle, as is indicated in FIG. 5. As shown there only one stop block on each side has been pivoted into the sliding path of the pivotal support 26 at the arrows 54, whereas the other stop block is prevented from pivoting due to the fact that it rests against the pivotal support 26 at the arrows 56. As the rig is straightened out each pivotal support 26 will, however, slide against the respective stop block 32 located at the arrows 54, until the stop blocks at arrows 56 are made free so that also they can pivot into the sliding path and the state illustrated in FIG. 4 can be attained, where the side supports are entirely locked.

FIG. 7 schematically illustrates a modification of the embodiment according to FIGS. 4-6, having the same way of operation as this. More particularly, the operating means of the stop blocks 32 have been otherwise designed. While cancelling elements 36-48, each stop block 32 on each side of the draw bar 18 includes a lever extension 58. The two lever extensions 58 are interconnected by means of a pneumatic or hydraulic cylinder 60. By means of the cylinder 60 the stop blocks 32 can be pivoted into or out of the sliding path of the pivotal support 26.

In FIG. 8 an embodiment is shown which, to a great extent, is designed the same way as the embodiment according to FIGS. 4-6 and 7, and which has identically the same way of operation as these.

The stop blocks 32 are influenced by a common double acting linear motor, e.g. a hydraulic motor 62. More particularly, the respective piston rods of the hydraulic motor 62 at one end are each pivotally connected to a link 64. Each link 64 is pivotally connected in between the stop blocks 32. The connection 66 between one end of the link 64 and the corresponding end of the stop block 32 also admits a limited relative shifting movement between the two elements. For this purpose the link 64 in the way shown at said end can include an elongated hole 67 cooperating with a pivot pin located on the end of the stop block 32.

Figure 9:
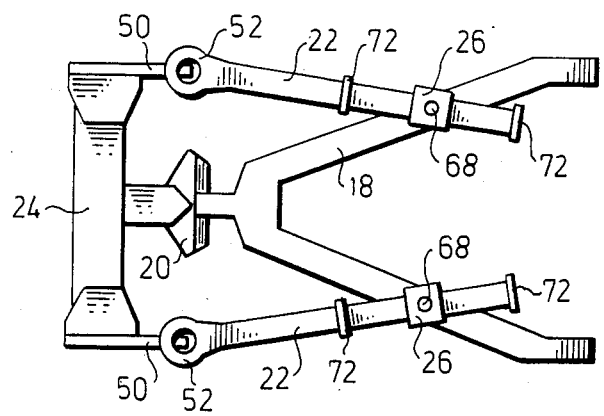
Figure 10:
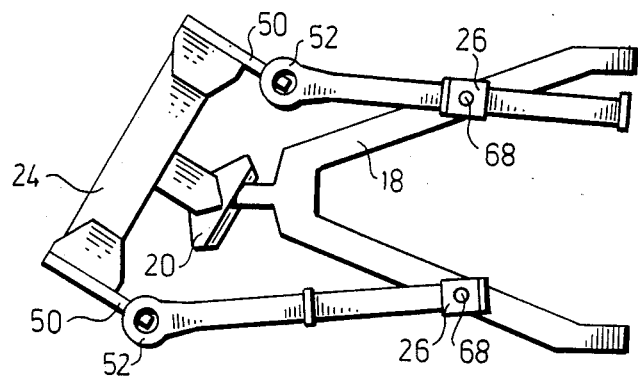

In FIGS. 9 and 10 a further embodiment is shown. The side supports 22 are slideable in sleeves forming the pivotal supports 26 and pivotally arranged on the drawbar 18 about an axis 68. Means, not shown, are arranged for locking the respective sleeve 26 and side support 22 in fixed relationship in a desired position. In FIG. 10 one side support 22 is shown as moved to the end position thereof in the sleeve 26.

Figure 11:
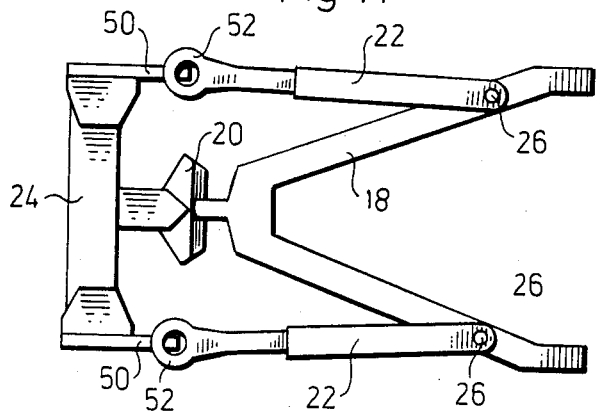
Figure 12:
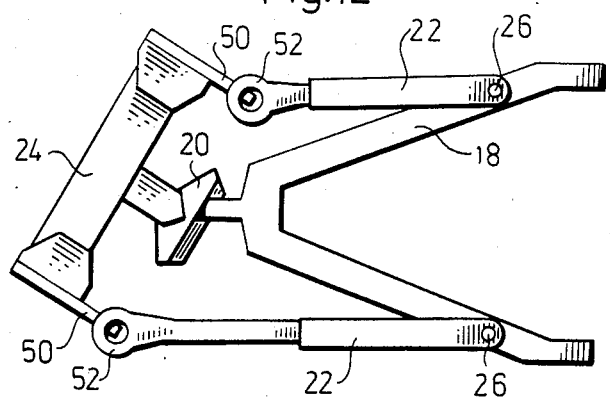

In FIGS. 11 and 12 an embodiment is shown where the drawbar 18 is provided with telescopic side supports 22 in the form of linear hydraulic motors. One end of the hydraulic motor 22 is then pivotally connected to the drawbar 18 in a fixed pivot point.

It should be realized that also the embodiment according to FIGS. 9-12 principally has the same way of operation as the earlier embodiments, i.e. the drawbar can be locked in a fixed central position and be released, respectively, for rotation with respect to the drawing vehicle.

In a further embodiment forming a modification of the embodiment according to FIG. 2, either sliding blocks corresponding e.g. to the sliding blocks 26 shown in FIG. 4, or sliding sleeves corresponding to the sliding sleeves shown in FIGS. 9 and 10, could be arranged for the connection of the side support 22 to the support element 24 in FIG. 2. Hereby principally the same way of operation as the embodiment according to FIGS. 4-6 and 9 and 10, respectively, could be obtained.

For making possible a minimum of space between the rear end of the semitrailer 6 and the front end of the vehicle 12 carried by the dolly 8, arrangements should be carried out in order to limit the angular deflection between the dolly 8 and the semitrailer 6. A limitation can thus e.g. be carried through to an angle on the order of magnitude of 30°. In the embodiment according to FIGS. 4-6 this limitation can be obtained by means of end stops 70 for the sliding movement of the pivotal supports 26, in FIGS. 9 and 10 by means of a suitable location of the end stop 72 of the side support 22 for the element 26, and in FIGS. 11 and 12 by means of suitable dimensioning of the hydraulic motor 22.

FIG. 13 schematically shows a coupling device that makes possible optional manual or automatic connection into operation of the side supports of the dolly for obtaining a rigid dolly.

In FIG. 13, 74 indicates a tooth wheel on the wheel shaft of the dolly 8 and 76 is a pickup co-operating therewith. The pickup 76 can be e.g. of an inductive type. The signals from the pickup 76 which are a function of the speed of the tooth wheel 74 are fed to a pulse transducer 78, that provides a suitable signal $v_1$ to the input of a comparator 80. At 82 a circuit is shown for producing a settable comparison value $v_2$, which is fed to a second input of the comparator 80 in order to be compared to the signal $v_1$ from the pulse transducer 78. The comparator 80 provides an output signal when $v_1$ is greater than $v_2$. The signal from 80 is fed to one input of an AND-gate 83, the other input of which obtains a signal from a time relay 84, the input of which is connected to the output of the circuit 80. The time relay 84 provides an output signal when at least 10 seconds have lapsed after an incoming signal occurred. On the output of the AND-gate 83 a signal is obtained in a manner known per se when both of its inputs obtain a signal. The output of the AND-gate 83 is connected to a first input of an OR-gate 86, which also has two further inputs and in a manner known per se provides an output signal when any of the inputs has a signal.

At 88 a further comparison circuit is arranged, that obtains an input signal $p_1$ representing the pressure in the brake pressure conduits of the drawing vehicle. This signal is compared to a comparison level $p_2$. The circuit 88 provides an output signal when the pressure signal $p_1$ that can e.g. represent a pressure of 0-8 bar, is greater than the set comparison level $p_2$, that can represent a pressure of 1-7 bar.

A further AND-gate 90 with two inputs obtains as a first input signal the output signal from the AND-gate 83 and as a second input the output signal from the comparator 88. The output signal of the AND-gate 90 is fed to an input of an OR-gate 92. The output signal of the OR-gate 92 is fed to a holding relay 94 that provides an output signal up to 3 seconds after the input signal has ceased. A further AND-gate 96 has two inputs connected to the output of the comparator 88 and the output of the holding relay 94, respectively, and the output of the AND-gate 96 is connected as a second input to the OR-gate 92.

The output of the holding relay 94 is also connected as a second input to the OR-gate 86 and to the third output of the OR-gate 86 a voltage level of 24 volts is connectable via a switch 98.

The voltage $U_1 = 24$ volts shall occur on the output of the OR-gate 86 when any of the following conditions is met:

1. $v_1$ is greater than $v_2$ and has been so during 10 seconds.
2. $p_1$ was greater than $p_2$ when condition 1 stopped to be true and is still greater than $p_2$, or has been greater than $p_2$ within 3 seconds as lapsed.
3. The switch 98 is closed.

The output signal $U_1$ is then used in a way easily conceivable to the man of the art in order to connect the side supports of the dolly into operation.

The control system described above gives the following function. At a determined limit velocity, e.g. 40 kilometers per hour, which has lasted for 10 seconds, determined by the time relay, the side supports are connected into operation. By the time delay of 10 seconds multiple connection and disconnection of the side supports is avoided if the velocity varies around the limit velocity. Upon manual connection into operation of the side supports by means of the switch 98 a warning lamp should be on in the driver's cabin. The side supports are maintained connected also if the velocity goes below the limit velocity but forceful braking occurs, i.e. the pressure signal $p_1$ exceeds $p_2$. In order to allow a so called pumping braking action with the side supports connected into operation the holding relay 94 secures that a time of 3 seconds should be allowed to pass before the side supports are disconnected if the brake pressure should sink below the set comparison value, i.e. if $p_1$ becomes less than $p_2$.

FIG. 14 in the form of a diagram illustrates the above described way of operation of the control system according to FIG. 13. The variation of the velocity with time is here introduced and the curve shown includes particularly two parts drawn with thicker lines and designated A and B when the side supports are connected into operation. The section A occurs during driving above the velocity limit. The section B is intended to illustrate driving with rigid dolly during braking down to below the velocity limit, the flattened portions of the curve B then indicating the pumping braking occurs. The sloping lines in FIG. 14 indicate the deceleration at the brake pressure limit $p_2$. In the section B the slope is greater than that of said lines.

We claim:

1. Dolly carrying a coupling, for connecting a trailing vehicle there to, a draw device for pivotable connection of the dolly to a drawing vehicle and elongated side supports which by a connection movement are movable from free positions to a lock position in which the side supports form an essentially rigid connection between the dolly and a support element carried by the drawing vehicle, in order to make the connection between the dolly and the drawing vehicle sidewardly rigid, said side supports being carried by pivotal supports on said draw device for allowing swinging movement of said side supports with respect to said draw device, slide means pivotably connected with said side supports and slidable along guide means for allowing continuous connection of said side supports to said support element during said swinging movement, stop means for stopping movement of said slide means and thus preventing said swinging movement of said side supports, and activating means for activating said stop means to stop movement of said slide means in a stop position corresponding to said lock position of said side supports.

2. Dolly according to claim 1, wherein said pivotal supports form said slide means and are slidable along said guide means, said stop means upon activation of said activating meads being arranged to arrest said pivotal supports against sliding movement when said side supports reach said lock position.

3. A dolly according to claim 1, wherein said stop means include blocks which are movably connected to said guide means, said blocks upon activation of said activating means when said slide means are not in said stop position, being forced to ride on said slide means without stopping the movement thereof until said slide means reach said stop position.

4. A dolly according to claim 1, including limit position stops cooperable with said side supports for preventing exceeding of a determined angular deflection between the driving vehicle and the dolly.

5. Dolly carrying a coupling for connecting a trailing vehicle thereto, a drawing device for pivotable connection of the dolly to a drawing vehicle and side supports for providing a centrally sidewardly rigid connection between the dolly and the drawing vehicle, characterized by means for automatically switching on and/or off the function of the side supports as controlled by at least one of the velocity of the dolly and braking of the drawing vehicle, means for sensing the velocity of the dolly and providing a velocity dependent signal, means receiving the velocity dependent signal and arranged to provide a switching on or off signal for the function of the side supports when the dolly passes a predetermined limit velocity, means (88) for sensing a braking parameter and providing a corresponding brake indicating signal, and means (90-96-86) arranged to receive this signal and at a predetermined value thereof, provide a switching on or off signal for the function of the side supports.

6. Dolly according to claim 5, characterized by means for delaying the switching off signal a determined space of time.

* * * * *